(12) United States Patent
Messemer et al.

(10) Patent No.: US 6,346,209 B1
(45) Date of Patent: Feb. 12, 2002

(54) METHOD AND APPARATUS FOR EJECTING MOLDED ARTICLES

(75) Inventors: Richard Joseph Messemer, Copley; Brian Joseph Wilson, Akron; Thomas Andrew Laurich, Tallmadge, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/545,254

(22) Filed: Apr. 7, 2000

(51) Int. Cl.[7] .............................................. B29C 45/40
(52) U.S. Cl. ........................ 264/334; 425/443; 425/556
(58) Field of Search ................................. 264/334, 336; 425/556, 443

(56) References Cited

U.S. PATENT DOCUMENTS

| | | |
|---|---|---|
| 2,395,100 A | 2/1946 | Caron |
| 2,711,567 A | 6/1955 | Knapp |
| 2,792,592 A | 5/1957 | McGee |
| 2,837,765 A | 6/1958 | Harvey |
| 2,946,102 A | 7/1960 | Mills |
| 3,161,918 A | 12/1964 | Zearbaugh |
| 3,362,046 A | 1/1968 | Blumer |
| 3,418,684 A | 12/1968 | Collins |
| 3,448,488 A | 6/1969 | Kiraly |
| 3,498,585 A | 3/1970 | Hudson |
| 3,614,810 A | 10/1971 | Schmier |
| 3,726,625 A | 4/1973 | Rees ........................... 425/247 |
| 3,807,682 A | 4/1974 | Catinella et al. .............. 249/68 |
| 4,752,200 A | 6/1988 | Bartschke .................... 425/139 |
| 5,196,213 A | 3/1993 | Watanabe et al. ........... 425/556 |
| 5,512,223 A * | 4/1996 | Morikita ..................... 425/556 |
| 5,648,103 A | 7/1997 | Takanohashi ............... 425/107 |

\* cited by examiner

Primary Examiner—Tim Heitbrink
(74) Attorney, Agent, or Firm—Bruce J. Hendricks; Frederick K. Lacher

(57) ABSTRACT

An ejector pin assembly for a split mold in which the ejector pin is held in a retracted position in a movable mold half, pushed into the mold cavity by a knock out pin contacted by the ejector pin during opening of the mold and held in contact with the knock out pin until it is pulled into the retracted position by the knock out pin upon opening of the mold.

9 Claims, 3 Drawing Sheets

METHOD AND APPARATUS FOR EJECTING MOLDED ARTICLES

TECHNICAL FIELD

This invention relates to ejector pins for ejecting molded articles from a mold cavity of an injection molding machine utilizing an ejector plate having knock out pins for engaging the ejector pins in the mold after opening of the mold and for pulling the ejector pins to retracted positions during closing of the mold and at the same time provide an increased stroke of the ejector pins.

BACKGROUND OF THE INVENTION

An injection molding machine such as that shown in U.S. Pat. No. 3,726,625 has ejector pins which are actuated by a knock out pin engageable with a stop which moves the retracted ejector pins into the mold cavity. This action takes place after a first mold half containing the ejector pins has been moved away from the opposite second mold half carrying the molded article to a spaced apart position where the ejector pins then force the article out of the first mold half. As shown in the patent, the movement of the actuating rods is limited by the spring of the ejector pins which is not desirable because the space required by the spring limits the stroke of the ejector pins.

SUMMARY OF THE INVENTION

The present invention is directed to an ejector pin assembly for a split mold in which each ejector pin is actuated by a knock out pin which is engageable with the pin for returning it to the retracted position without requiring a spring.

In accordance with one aspect of the invention, there is provided a method of injection molding a molded article in a split mold having an upper mold half providing a mold cavity and an ejector plate having knock out pins for engagement with ejector pins in the upper mold half comprising:

a. injecting a moldable material into the mold cavity;
  b. separating the lower mold half from the upper mold half whereby the molded article is pulled away from the lower mold half;
  c. depressing the ejector plate carrying the knock out pins into engagement with the ejector pins and movement of the ejector pins into the mold cavity to eject the molded article into the space between the upper mold half and the lower mold half;
  d. removing the moldable article from the space; characterized by,
  e. lifting the ejector plate and the ejector pins into a retractable position by the engagement of the knock out pins with the ejector pins; and,
  f. disengaging the knock out pins from the ejector pins in the retracted position during additional lifting movement of the ejector plate.

In accordance with another aspect of the invention, there is provided apparatus for injection molding a molded article in a mold cavity comprising:

a. an upper mold half;
  b. a lower mold half;
  c. ejector pins mounted on the upper mold half;
  d. an ejector plate positioned over the upper mold half having knock out pins for engaging the ejector pins;
  e. means for raising the lower mold half to provide the mold cavity;
  f. means for injecting moldable material into the mold cavity to form the molded article;
  g. means for lowering the lower mold half with the molded article attached to the upper mold half;
  h. means for lowering the ejector plate to engage the knock out pins with the ejector pins for extending the ejector pins to eject the molded article from the upper mold half;
  i. means for raising the ejector plate to retract the knock out pins and the ejector pins which are in engagement with the knock out pins; characterized by,
  j. means to grip the ejector pins in the retracted position; and,
  k. means for disengaging the knock out pins from the ejector pins in the retracted position of the ejector pins.

DETAILED DESCRIPTION OF THE INVENTION

Figure 1:
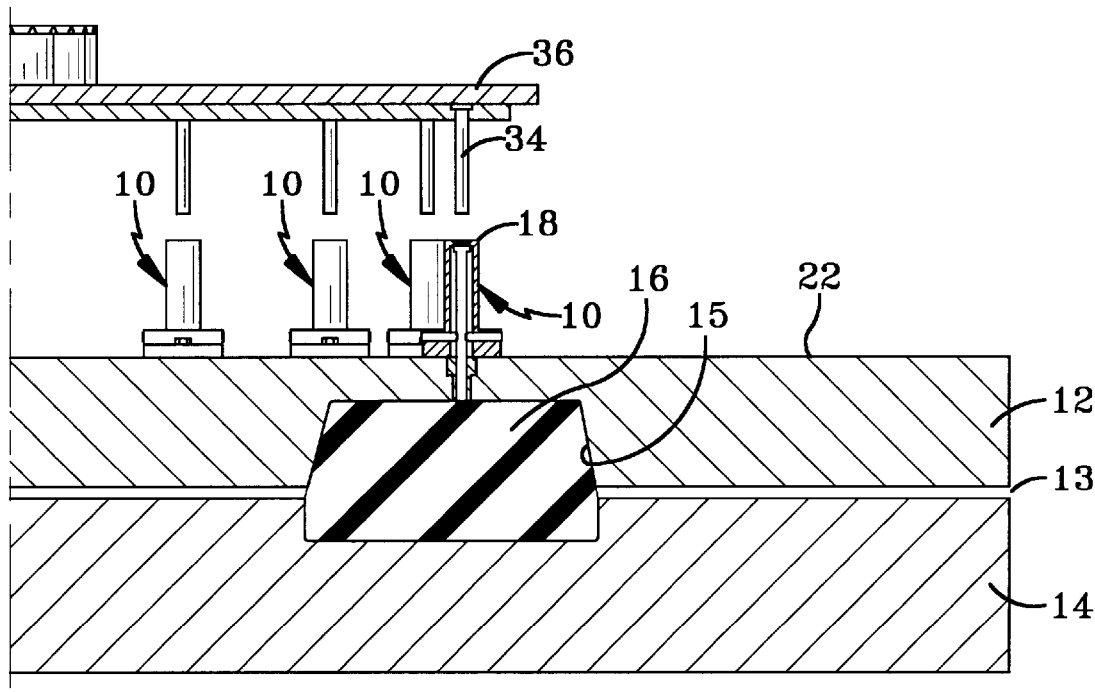
FIG. 1 is a schematic fragmentary sectional view of a closed injection mold showing the ejector plate in the retracted position.
Figure 2:
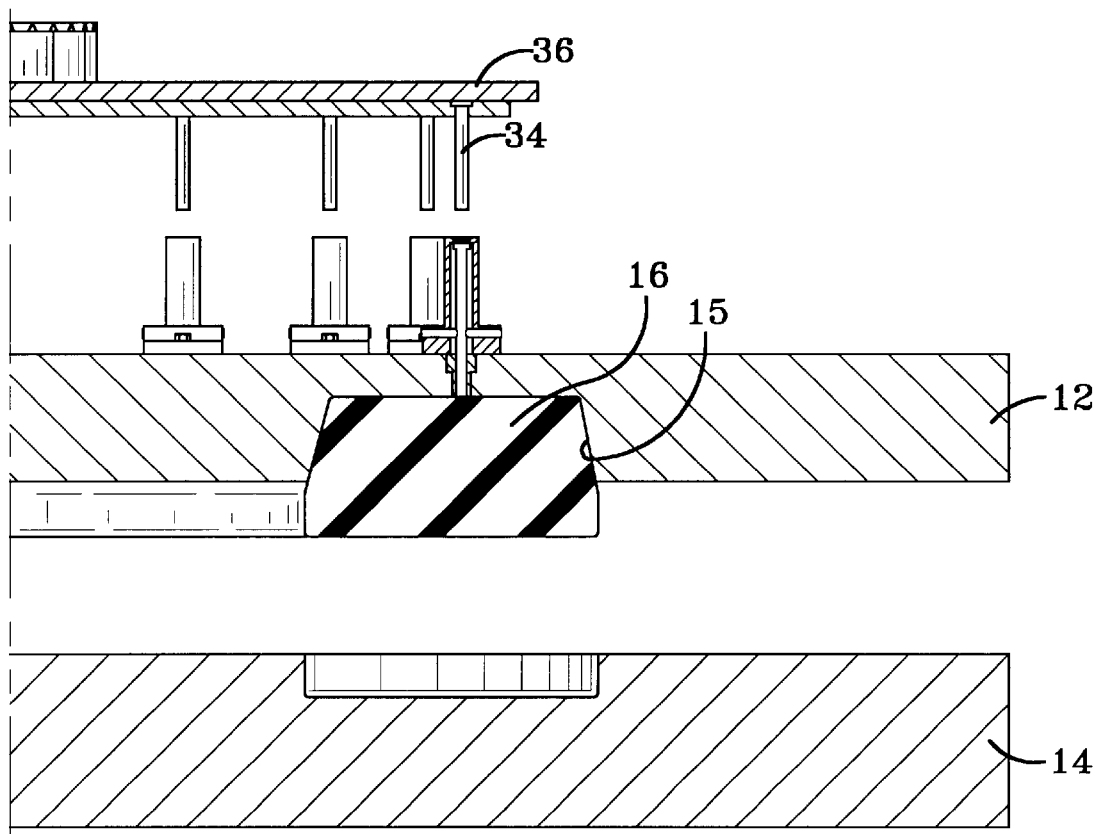
FIG. 2 is a view like FIG. 1 showing the mold opened with the molded article in the upper mold half.
Figure 3:
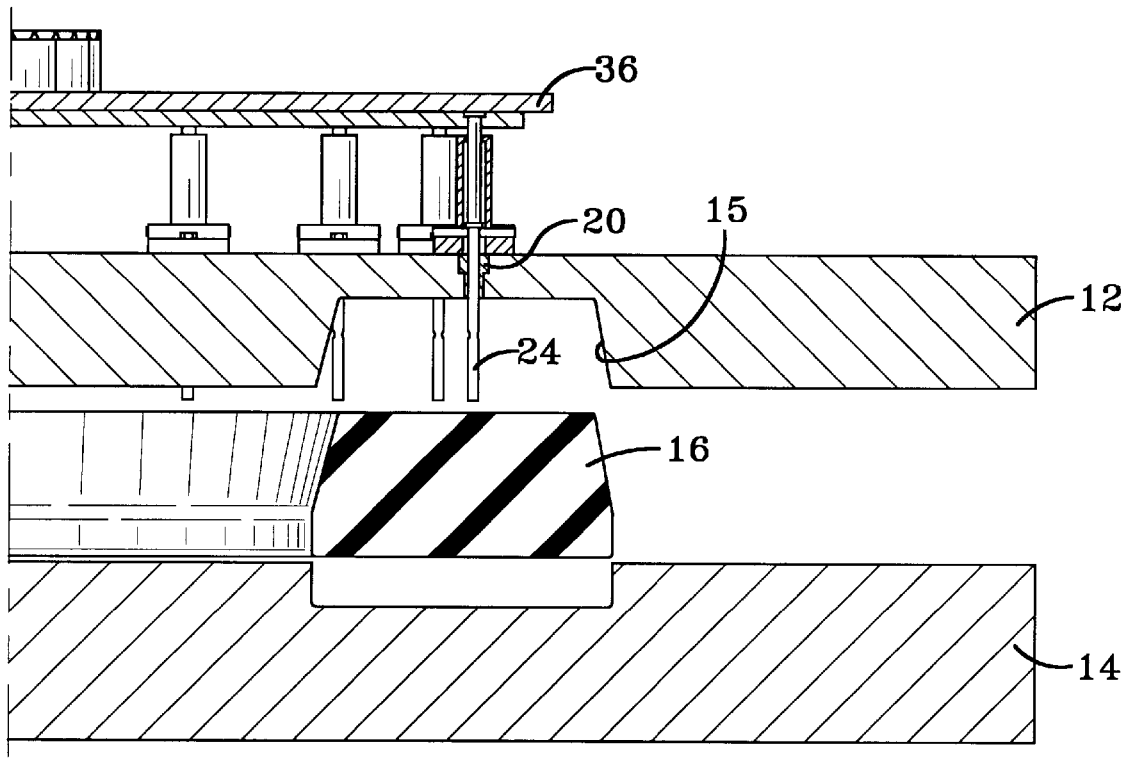
FIG. 3 is a view like FIG. 2 showing the ejector plate lowered to extend the ejector pins and eject the molded article.

Referring to FIGS. 1, 2 and 3, the steps of injection molding, opening the mold and injecting the molded article are illustrated. An injector pin assembly 10 is shown mounted on a stationary upper mold half 12 of a split mold 13 having a movable lower mold half 14 providing a mold cavity 15 for injecting a molded article 16 in the closed condition of the mold.

In FIG. 1 the mold 13 is closed for injection of the rubber to form molded article 16. In FIG. 2 the lower mold half 14 has been lowered and the molded article 16 is held in the upper mold half 12 by means well known in the art of injection molding. In FIG. 3 the molded article 16 has been injected from the upper mold half 12 in accordance with the method and apparatus of this invention.

Figure 4:
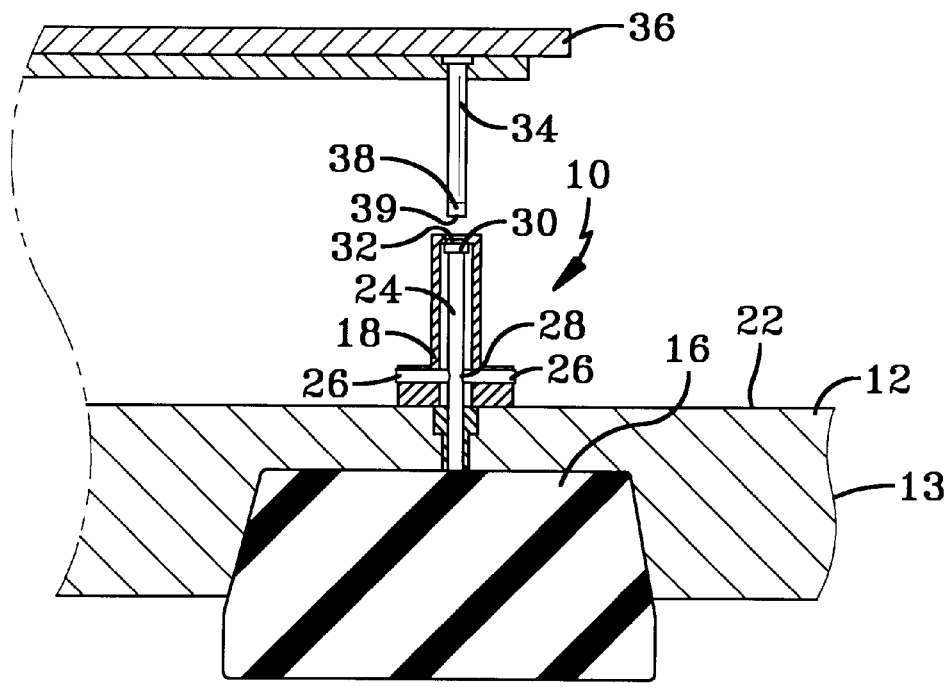
FIG. 4 is an enlarged fragmentary sectional view like FIG. 2 showing one of the ejector pins in the retracted position prior to engagement by the knock out pin.

Referring to FIG. 4 the apparatus of this invention is shown in greater detail. Mounted on the upper mold half 12 are a plurality of cylindrical pin housings or towers 18 each having a sleeve 20 mounted on the wall 22 of the upper mold half. An ejector pin 24 is slidably mounted in the sleeve 20 and is held in a retracted position as shown in FIG. 1 by holding means such as spring loaded balls 26 engageable with a groove 28 in the wall of the ejector pin 24. The ejector pin 24 may have a flanged end 30 with a diameter greater than an opening 32 in each of the towers 18 to limit the upward movement of the pin into the retracted position shown in FIGS. 1, 2 and 4.

A knock out pin 34 is mounted on an ejector plate 36 of the mold 13 and positioned over each of the ejector pins 24 where it is movable downward with the plate in a manner well known to those skilled in the art. Each knock out pin 34 may be engageable with each ejector pin 24 by gripping means such as a magnet 38 mounted on the end 39 of the knock out pin. The magnet 38 is engageable with the flanged end 30 of the ejector pin 24 in the ejecting position shown in FIG. 3 for returning the ejector pin to the retracted position shown in FIG. 1 and 2.

Referring to FIGS. 2 and 4, the injection pin assembly 10 is shown with the lower mold half 14 moved from a position where the lower mold half has been moved away from the upper stationary mold half 12 to a position where the end 39 of the knock out pin 34 contacts the flanged end 30 of the ejector pin 24. Upon movement of the ejector plate 36 toward the upper mold half 12, each of the ejector pins 24 pushes the molded article 16 away from the upper mold half 12. The molded article 16 may then fall upon an unloader or the lower mold half 14 and be removed from the mold 13.

Following removal of the molded article 16 from the mold 13., the ejector plate 36 is moved away from the upper mold half and each of the ejector pins 24 is pulled through the sleeve 20 and housing 18 by the magnet 38 to a position where the flanged end 30 engages the edges of the restricted opening 32. At this time, the spring loaded balls 26 are urged into the groove 28 of each of the ejector pins 24 holding them in the retracted position shown in FIGS. 1, 2 and 4. The lower mold half 14 may then be moved to the closed position providing the mold cavity 15 for injecting another molded article 16 as shown in FIG. 1.

Although in this embodiment a magnet 38 is used to engage the flanged end 30 of each of the ejector pins 24, it is understood that other disengageable connectors may be provided between the knock out pins 34 and ejector pins. For example, each of the ejector pins 24 may have a threaded extension extending through the opening 32 in the housing 1 8. The corresponding knock out pin 34 may have a threaded bushing engageable with the threaded extension upon movement of the ejector plate 36 toward the upper mold half with means for rotating the bushing to connect each of the knock out pins 34 and the corresponding ejector pins 24 so that the knock out pins can pull the ejector pins into the retracted position shown in FIGS. 1, 2 and 4 and be released upon further retraction of the ejector plate.

Figure 6:
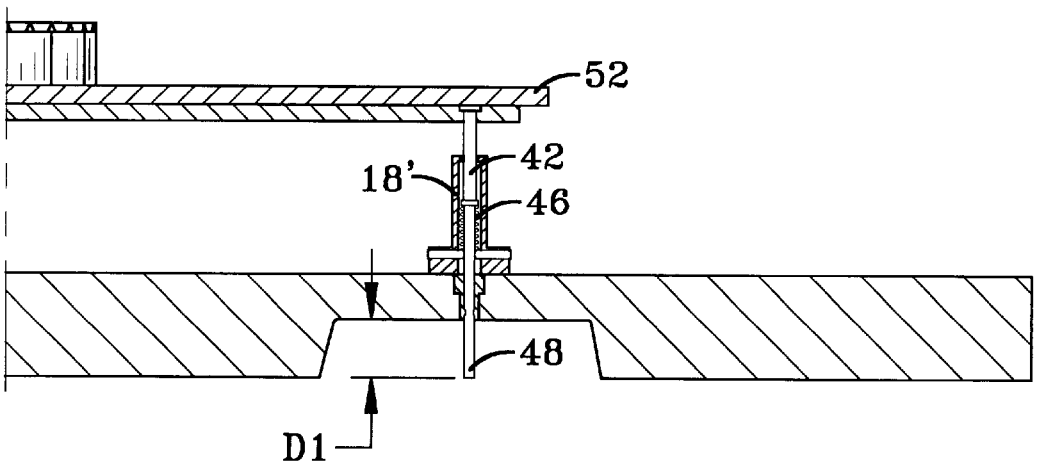
FIG. 6 is a view like FIG. 5 of a prior art ejector pin assembly illustrating the reduced stroke of the ejector pin.
Figure 5:
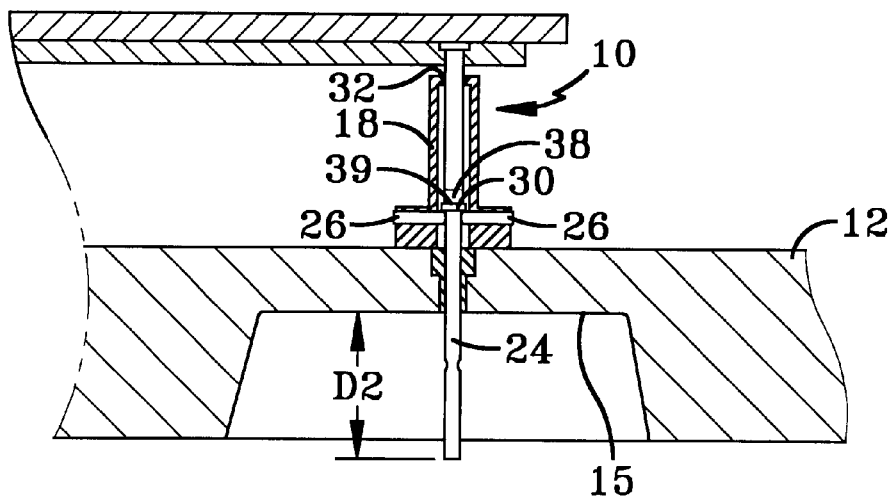
FIG. 5 is a view like FIG. 4 showing the ejector pin in the extended position after ejecting the molded article illustrating the stroke of the pin.

The advantage of this invention is evident from a comparison of the prior art shown in FIG. 6 with the apparatus of this invention shown in FIG. 5. In the prior art the knock out pin 42 is slidably mounted in the cylindrical pin housing 18 and a spring 46 is provided for returning the ejector pin 48 to the retracted position as shown in FIG. 4. To eject the molded article 50, the knock out pin 42 is moved by an ejector plate downward to compress the spring 46 to the ejected position shown in FIG. 6. It can be seen that the movement of the ejector pin 48 is limited by the compressed spring 46 to a stroke distance D-1. With the construction of the present invention shown in FIG. 5, the stroke distance D-2 is substantially increased with the same length of the ejector pin 24. This is important for positive ejection of the molded articles which may be resilient and require a greater stroke for ejection.

In operation an unloader which may be a robot arm is inserted between the upper mold half 12 and lower mold half 14 in the open condition of the mold to grip the molded article 16 and remove it from the mold 13

While a certain representative embodiment and details have been shown for the purpose of illustrating the invention, it will be apparent to those skilled in the art that various modifications may be made therein without departing from the invention.

What is claimed is:

1. A method of injection molding a molded article in a split mold having an upper mold half providing a mold cavity and an ejector plate having knock out pins for engagement with ejector pins in said upper mold half comprising:
   a. injecting a moldable material into said mold cavity;
   b. separating said lower mold half from said upper mold half whereby said molded article is pulled away from said lower mold half;
   c. depressing said ejector plate carrying said knock out pins into engagement with said ejector pins and movement of said ejector pins into said mold cavity to eject said molded article into the space between said upper mold half and said lower mold half;
   d. removing said moldable article from said space; characterized by,
   e. lifting said ejector plate and said ejector pins into a retractable position by said engagement of said knock out pins with said ejector pins; and,
   f. disengaging said knock out pins from said ejector pins in the retracted position during additional lifting movement of said ejector plate.

2. The method of claim 1 further characterized by said knock out pin including pulling means at one end for engagement with an end of said ejector pin for pulling said ejector pin into said retracted position.

3. The method of claim 2 further characterized by said pulling means comprising a magnetic material on said one end of said knock out pin.

4. The method of claim 2 further characterized by limiting movement of said ejector pin to said retracted position by stop means on said first movable mold half engageable by a flange means on said ejector pin.

5. An ejector pin assembly for a split mold having a mold cavity between a first movable mold half and a second stationary mold half, said ejector pin being mounted on said first movable mold half for extension into said mold cavity in the open condition of said mold, and retraction from said mold cavity in the closed condition of said mold characterized by a knockout pin positioned in spaced apart relation to said ejector pin in a closed condition of said mold and engageable with said ejector pin in an open condition of said mold for pushing said ejector pin into said mold cavity and said knock out pin having pulling means for pulling said ejector pin into a retracted position upon closing of said mold.

6. The ejector pin assembly of claim 5 further characterized by holding means on said movable mold half for holding said ejector pin in said retracted position after being pulled into said retracted position by said knock out pin.

7. The ejector pin assembly of claim 6 further characterized by said pulling means being a magnetic material on one end of said knock out pin.

8. The ejector pin assembly of claim 5 further characterized by said knock out pin being mounted on a stationary member spaced from said stationary mold half for engagement by said ejector pin upon opening of said mold and disengagement upon opening of said mold and pulling of said ejector pin into said retracted position.

9. Apparatus for injecton molding a molded article in a mold cavity comprising:
   a. an upper mold half;
   b. a lower mold half;

c. ejector pins mounted on said upper mold;
d. an ejector plate positioned over said upper mold half having knock out pins for engaging said ejector pins;
e. means for raising said lower mold half to provide said mold cavity;
f. means for injecting moldable material into said mold cavity to form said molded article;
g. means for lowering said lower mold half with said molded article attached to said upper mold half;
h. means for lowering said ejector plate to engage said knock out pins with said ejector pins for extending said ejector pins to eject said molded article from said upper mold half;
i. means for raising said ejector plate to retract said knock out pins and said ejector pins which are in engagement with said knock out pins;
j. means to grip said ejector pins in the retracted position; and,
k. means for disengaging said knock out pins from said ejector pins in said retracted position of said ejector pins.

* * * * *